(12) United States Patent
Jang et al.

(10) Patent No.: US 8,010,982 B2
(45) Date of Patent: Aug. 30, 2011

(54) METHOD AND SYSTEM FOR SETTING CHANNEL IN DVB-H SERVICE

(75) Inventors: Byung-Wook Jang, Suwon-si (KR); Ji-Ho Park, Seoul (KR); Hyung-Kyu Song, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 777 days.

(21) Appl. No.: 11/947,187

(22) Filed: Nov. 29, 2007

(65) Prior Publication Data

US 2008/0141319 A1 Jun. 12, 2008

(30) Foreign Application Priority Data

Nov. 29, 2006 (KR) .......................... 10-2006-0119381

(51) Int. Cl.
*H04N 7/16* (2006.01)
*H04N 7/173* (2006.01)

(52) U.S. Cl. ............................ 725/62; 725/116; 725/118

(58) Field of Classification Search .......................... None
See application file for complete search history.

(56) References Cited

U.S. PATENT DOCUMENTS

| | | | |
|---|---|---|---|
| 2005/0090235 A1 | 4/2005 | Vermola et al. | |
| 2007/0036102 A1* | 2/2007 | Hwang et al. | 370/328 |
| 2007/0110105 A1* | 5/2007 | Usuki et al. | 370/487 |

FOREIGN PATENT DOCUMENTS

| | | |
|---|---|---|
| EP | 1 684 450 | 7/2006 |
| EP | 1684450 A2 * | 7/2006 |
| EP | 1 871 024 | 12/2007 |
| WO | WO 2006/114830 | 11/2006 |

OTHER PUBLICATIONS

Digital Video Broadcasting (DVB);, Transmission System for Handheld Terminals (DVB-H), ETSI EN 302 304 V1.1.1, Nov. 1, 2004.

* cited by examiner

*Primary Examiner* — Andrew Y Koenig
*Assistant Examiner* — Mark D Featherstone
(74) *Attorney, Agent, or Firm* — The Farrell Law Firm, P.C.

(57) ABSTRACT

Provided is a method and system for setting a new channel when a DVB-H terminal sets a channel initially or changes the channel. The method includes a DVB-H server transmitting Program Specific Information (PSI)/Service Information (SI) and burst data of Audio/Video (A/V) streams corresponding to a plurality of service channels, a DVB-H terminal detecting a number of a plurality of elementary streams included in a new channel and Packet Identifiers (PIDs) corresponding to the respective elementary streams from the PSI/SI, which has been received from the DVB-H server and stored, in response to a setting request of the new channel from a user, and setting the detected PIDs as temporary receive PIDs, and if the DVB-H terminal detects burst data having a PID equal to any of the temporary receive PIDs from among the burst data received from the DVB-H server, the DVB-H terminal sets the PID corresponding to the detected burst data as a final receive PID and received only burst data having the final receive PID.

17 Claims, 6 Drawing Sheets

METHOD AND SYSTEM FOR SETTING CHANNEL IN DVB-H SERVICE

PRIORITY

This application claims priority under 35 U.S.C. §119(a) to a patent application filed in the Korean Intellectual Property Office on Nov. 29, 2006 and assigned Serial No. 2006-119381, the contents of which are hereby incorporated by reference.

BACKGROUND OF THE INVENTION

1. Field of the Invention

The present invention relates generally to a Digital Video Broadcasting-Handheld (DVB-H) service, and in particular, to a method and system for quickly setting a new channel when a DVB-H terminal initially sets a channel or changes the channel.

2. Description of the Related Art

In general, digital broadcasting is a broadcasting service for providing high image quality, high sound quality, and a high-level service to users by replacing conventional analog broadcasting. There are various kinds of digital broadcasting, for example, Digital Multimedia Broadcasting (DMB), Digital Audio Broadcasting (DAB), Digital Video Broadcasting (DVB), MediaFLO (Forward Link Only), and DVB-Handheld (DVB-H).

A DVB-H service uses an Internet Protocol Data Casting (IPDC) method of broadcasting broadcast data by compressing the broadcast data containing Audio/Video (A/V) data in a predetermined packet unit basis as in a wired/wireless Internet system. In order to reduce the power consumption of a DVB-H terminal, a DVB-H server collects data to be transmitted for a predetermined time interval as burst data and transmits the burst data at every predetermined time interval without continuously transmitting the data.

FIG. 1 illustrates a time slicing transmission method of a DVB-H service. FIG. 1 shows timing slicing of an A/V stream 10 corresponding to a single A/V channel, wherein the timing slicing is achieved in a period of time between $t_0$ and $t_1$. Referring to a transport stream 20, a DVB-H server collects data corresponding to the time between $t_0$ and $t_1$ from among the A/V stream 10 for a short burst duration beginning from the time point $t_1$, i.e. a time slice, and transmits the collected data. $D_0$ denotes the transmitted burst data. The DVB-H server stops transmitting the A/V stream 10 for a time duration from when the time slice corresponding to $D_0$ ends to when a subsequent time slice starts. The time duration is referred to as off-time. A digital broadcasting receiver of a DVB-H terminal is activated during only the time slice and deactivated during the other duration, i.e. the duration in which the A/V stream 10 is not transmitted.

As illustrated in FIG. 2 according to the prior art, a transport stream 40 with respect to an A/V stream 30 corresponding to a single channel service includes a single elementary stream, and the A/V stream 30 is transmitted by means of the single elementary stream. That is, an A/V packet is only once transmitted via a DVB-H channel.

As described above, according to the conventional time slicing transmission method, when a single service, i.e. a single A/V stream, is considered, if off-time is decreased, an average time taken from when a DVB-H terminal decides to receive the single A/V stream to when burst data of the single A/V stream is actually received is reduced, whereas current consumption in a digital broadcasting receiver of the DVB-H terminal increases. On the contrary, if the off-time is increased, the current consumption in the digital broadcasting receiver decreases, whereas the average time taken from when the DVB-H terminal decides to receive the single A/V stream to when the burst data of the single A/V stream is actually received is increased. The decision to receive the single A/V stream can be achieved by means of a channel change to a channel corresponding to the single service.

As described above, there is a trade-off relation ship between power consumption in a DVB-H terminal and an average time taken to receive actual burst data. In other words, when the DVB-H terminal sets a new DVB-H service channel, if the time-off is decreased in order to reduce the time taken to set a channel, power consumption increases, and if the time-off is increased in order to reduce power consumption, a channel setting time increases.

SUMMARY OF THE INVENTION

An aspect of the present invention is to substantially solve at least the above problems and/or disadvantages and to provide at least the advantages below. Accordingly, an aspect of the present invention is to provide a method and service for minimizing battery consumption of a DVB-H terminal receiving a DVB-H service and reducing an average time from when a service of a new channel is selected to when the actual packet data is received.

Another aspect of the present invention is to provide a method and service used by a DVB-H terminal to improve a DVB-H service start speed of a new channel and a channel switching speed corresponding to a user request for changing to a new channel.

According to one aspect of the present invention, there is provided a method of setting a channel in a Digital Video Broadcasting-Handheld (DVB-H) service, the method including a DVB-H server transmitting Program Specific Information (PSI)/Service Information (SI) and burst data of Audio/Video (A/V) streams corresponding to a plurality of service channels; a DVB-H terminal detecting a number of a plurality of elementary streams included in a new channel and Packet Identifiers (PIDs) corresponding to the respective elementary streams from the PS/SI, which has been received from the DVB-H server and stored, in response to a setting request of the new channel from a user, and setting the detected PIDs as temporary receive PIDs; and if the DVB-H terminal detects burst data having a PID equal to any of the temporary receive PIDs from among the burst data received from the DVB-H server, the DVB-H terminal setting the PID corresponding to the detected burst data as a final receive PID and receiving only burst data having the final receive PID.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

In general, in a Digital Video Broadcasting-Handheld (DVB-H) service, a DVB-H server transmits system information, such as channel information, to a DVB-H terminal using Program Specific Information (PSI)/Service Information (SI), and the DVB-H terminal receives an Audio/Video (A/V) stream based on the PSI/SI and reproduces the A/V stream. If a user of the DVB-H terminal designates a channel on the DVB-H terminal in order to view content of a specific service, a destination Internet Protocol (IP) address unique to the service corresponding to the designated channel is selected. The DVB-H terminal can obtain a Packet Identifier (PID) assigned to the A/V stream by referring to target_IP_address_descriptor contained in an SI Information Notification Table (INT) and a Program Map Table (PMT), which have been received and stored. The DVB-H terminal receives and reproduces burst data corresponding to the obtained PID.

Thus, while a conventional DVB-H server constructs elementary streams corresponding to a single A/V stream and assigns data having a predetermined size to a single burst when burst data to be transmitted at one time is constructed by collecting encoded A/V data, according to an exemplary embodiment of the present invention, a single service can be transmitted using two or more elementary streams, wherein a PID is assigned to each elementary stream. That is, the present invention allows a user to use a plurality of PIDs corresponding to a single destination IP address. In addition, in the present invention, an elementary stream field indicating the number of elementary streams for a single A/V service and PIDs assigned to the respective elementary streams is added to PSI/SI using a descriptor writer.

Thus, a DVB-H terminal according to the present invention receives and stores PSI/SI, checks the elementary stream field added according to the present invention when a user selects a channel, and sets all relevant PIDs to receive burst data corresponding to the relevant PIDs. If a single piece of the burst data is received at the first time from among the burst data, the DVB-H terminal cancels the setting of all of the relevant PIDs except for a PID corresponding to the initially received burst data.

Figure 3:
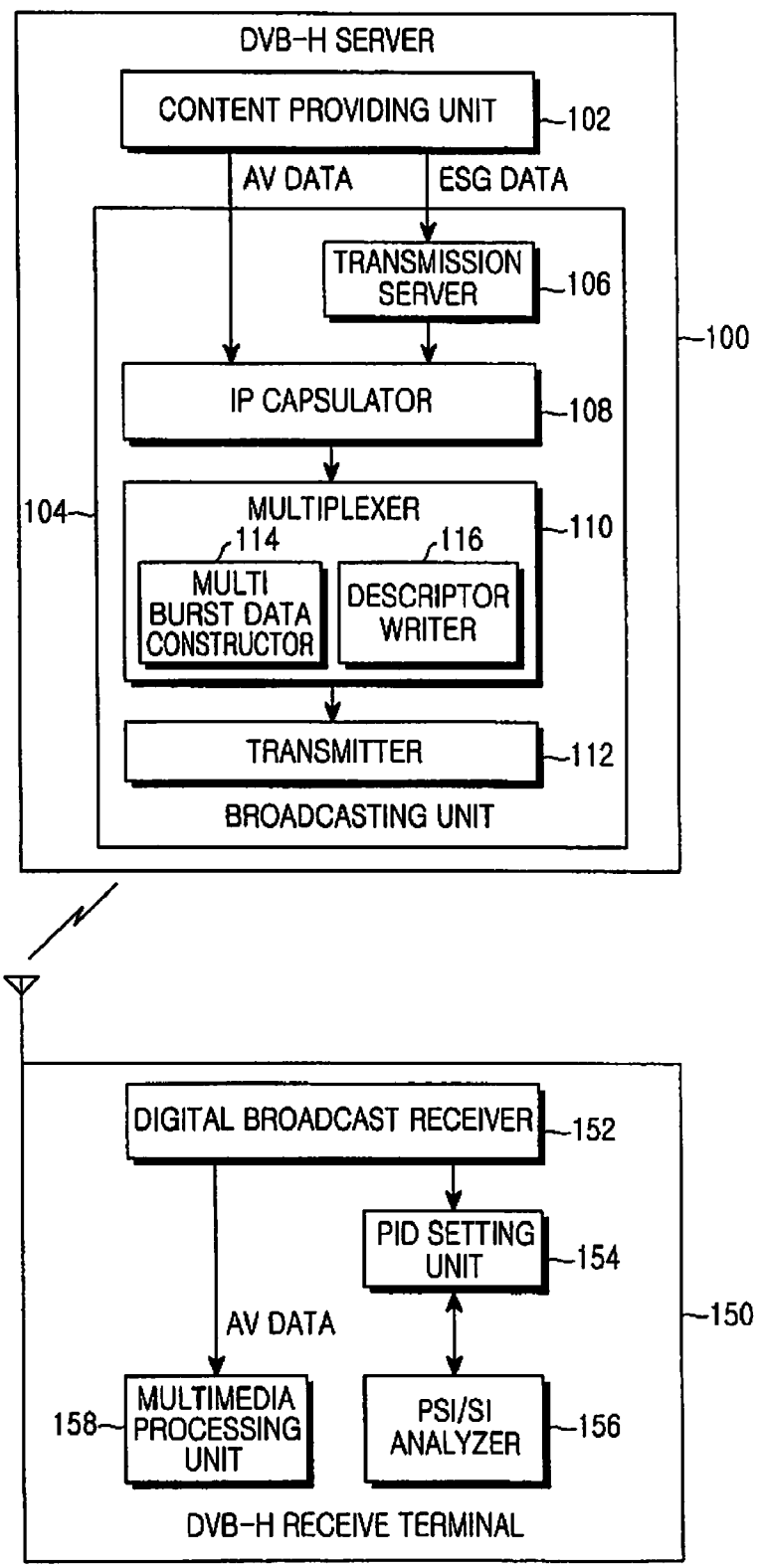
FIG. 3 is a block diagram of a Digital Video Broadcasting-Handheld (DVB-H) system according to an exemplary embodiment of the present invention.

A configuration of a DVB-H system according to an exemplary embodiment of the present invention will now be described with reference to FIG. 3. The DVB-H system generally includes a DVB-H server 100 and a DVB-H terminal 150. According to an exemplary embodiment of the present invention, the DVB-H server 100 provides a DVB-H service and can include a content providing unit 102 and a broadcasting unit 104. The content providing unit 102 is a component managed by a content provider and generates various kinds of digital broadcast content to be broadcast by the DVB-H server 100. The broadcasting unit 104 is a component managed by a communication provider and transmits a Radio Frequency (RF) signal by packetizing and multiplexing broadcast content generated by the content providing unit 102. Data provided by the content providing unit 102 can be largely divided into A/V data and an Electronic Service Guide (ESG). The A/V data is multimedia data for a terminal of a recipient to reproduce as an audio signal and a video signal broadcast content provided by the content providing unit 102, and the ESG is guide information of various kinds of broadcast content provided by the content providing unit 102 and is data used by a user to search for desired broadcast content. When the data is provided from the content providing unit 102, the communication provider broadcasts the data by packetizing and multiplexing the data in a digital broadcasting method using the broadcasting unit 104. Thus, the broadcasting unit 104 includes an IP capsulator 108 for packetizing broadcast data, a transmission server 106, a multiplexer 110, and a transmitter 112.

The IP capsulator 108 is a component for IP capsulation, i.e. packetization, of A/V data and ESG data according to an Internet Protocol Data Casting (IPDC) method, which is a broadcasting method of the DVB-H system. The broadcasting unit 104 may increase the integrity of data which is to be transmitted using the transmission server 106 to which a flute protocol is applied. The flute protocol used to more safely transmit data, which cannot be parsed in an error state, such as the ESG data.

The multiplexer 110 multiplexes A/V streams packetized by the IP capsulator 108. In particular, the multiplexer 110 includes a multi burst data constructor 114 and a descriptor writer 116 in order to construct a plurality of elementary streams having time slices at different time points with respect to a single A/V stream corresponding to a single service according to an exemplary embodiment of the present invention.

The multi burst data constructor 114 constructs a plurality of elementary streams having time slices at different time points in response to a single A/V stream according to an exemplary embodiment of the present invention. The multi burst data constructor 114 assigns a unique PID to each elementary stream. That is, a plurality of PIDs are assigned to an A/V stream corresponding to a single channel service, and the number of PIDs is equal to the number of the plurality of elementary streams constructed in to the A/V stream.

Figure 4:
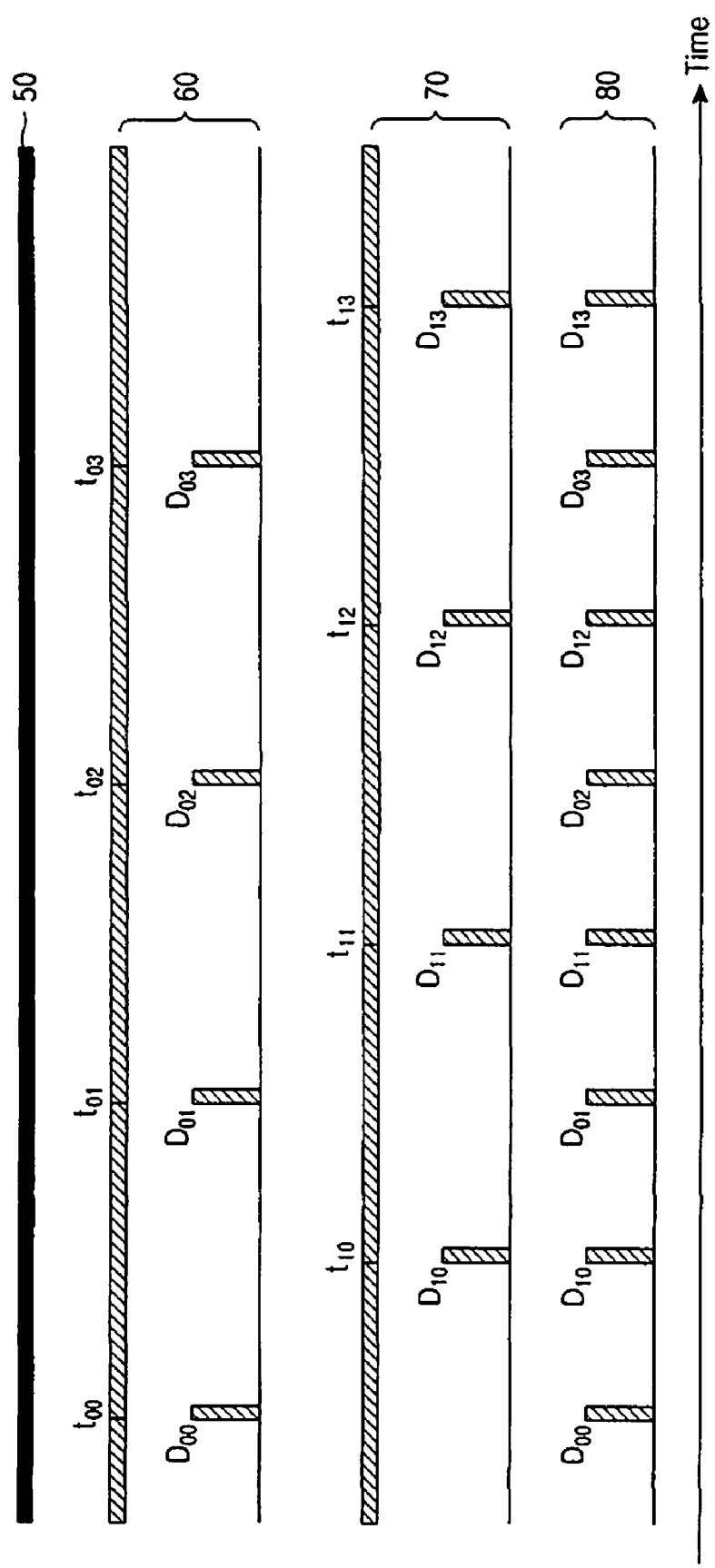
FIG. 4 is a diagram for describing how to construct burst data according to an exemplary embodiment of the present invention.

An example of the plurality of elementary streams is illustrated in FIG. 4. FIG. 4 shows two elementary streams 60 and 70 constructed to correspond with a single A/V stream 50 Referring to FIG. 4, the first elementary stream 60 corresponding to the A/V stream 50 is obtained by time slicing the A/V stream 50 in a period of time from $t_{0N}$ to $t_{0(N+1)}$, wherein a transmission start time point of a time slice DON corresponding to $t_{0N}$ is $t_{0N}$. That is, time slices $D_{00}$, $D_{01}$, $D_{02}$, and $D_{03}$ start at $t_{00}$, $t_{01}$, $t_{02}$, and $t_{03}$, respectively. According to the first elementary stream 60, each packet between $t_{0N}$ and $t_{0(N+1)}$ of the A/V stream 50 is transmitted at a time slice $D_{0(N+1)}$. The second elementary stream 70 corresponding to the A/V stream 50 is obtained by time slicing the A/V stream 50 in a period of time from $t_{1N}$ to $t_{1(N+1)}$, wherein a transmission start time point of a time slice $D_{1N}$ corresponding to $t_{1N}$ is $t_{1N}$. That is, time slices $D_{10}$, $D_{11}$, $D_{12}$, and $D_{13}$ start at $t_{10}$, $t_{11}$, $t_{12}$, and $t_{13}$, respectively. According to the second elementary stream 70, each packet between $t_{1N}$ and $t_{1(N+1)}$ of the A/V stream 50 is transmitted at a time slice $D_{1(N+1)}$. The time slicing period of the first elementary stream 60 may be equal to the time slicing period of the second elementary stream 70, however, the time points at which the time slices $D_{0(N-1)}$ and $D_{1(N+1)}$ of the elementary streams 60 and 70 exist must be different from each other. In addition, different PIDs are assigned to the elementary streams 60 and 70.

Referring back to FIG. 3, the descriptor writer 116 writes the number of the plurality of elementary streams constructed that correspond to a single A/V stream and the PIDs assigned to the respective elementary streams by the multi burst data constructor 114 into PSI/SI. Thus, a new field, e.g. an elementary stream field, can be added to the PSI/SI.

The transmitter 112 constructs a transport stream so that the transport stream contains all time slices of a plurality of elementary streams having time slices at different time points, which were constructed in response to an arbitrary A/V stream, and transmits burst data. That is, referring to FIG. 4, a transport stream 80 of the A/V stream 50, which is comprised of the first and second elementary streams 60 and 70 having time slices at different time points, contains all the time slices $D_{00}$, $D_{01}$, $D_{02}$, $D_{03}$, $D_{10}$, $D_{11}$, $D_{12}$, and $D_{13}$ of the first and second elementary streams 60 and 70, and according to the transport stream 80, burst data corresponding to each time slice is transmitted. Thus, a single A/V stream is transmitted twice at the same time.

If the DVB-H server 100 broadcasts multiplexed A/V data and PSI/SI data, the DVB-H terminal 150 of the user receives the multiplexed A/V data and PSI/SI data using a digital broadcast receiver 152. The digital broadcast receiver 152 demultiplexes and decapsulates the multiplexed A/V data and PSI/SI data using a demultiplexer (not shown) and an IP decapsulator (not shown). A multimedia processing unit 158 outputs digital broadcasting according to a channel selected by the user by reproducing the A/V data input from the digital broadcast receiver 152. The PSI/SI data is stored in a memory unit (not shown). According to an exemplary embodiment of the present invention, if the user selects a new channel, a PSI/SI analyzer 156 searches for and locates PSI/SI data related to the selected channel, detects the number of elementary streams and PIDs corresponding to the respective elementary streams from the located PSI/SI data according to the selected channel, and transmits the detected information to a PID setting unit 154. The PID setting unit 154 sets the received PIDs as temporary receive PIDs. Thereafter, if burst data having a PID equal to any of the temporary receive PIDs is received by the digital broadcast receiver 152, the PID setting unit 154 sets the PID as a receive PID to continuously receive burst data and cancels the setting of the other temporary receive PIDs.

Figure 5:
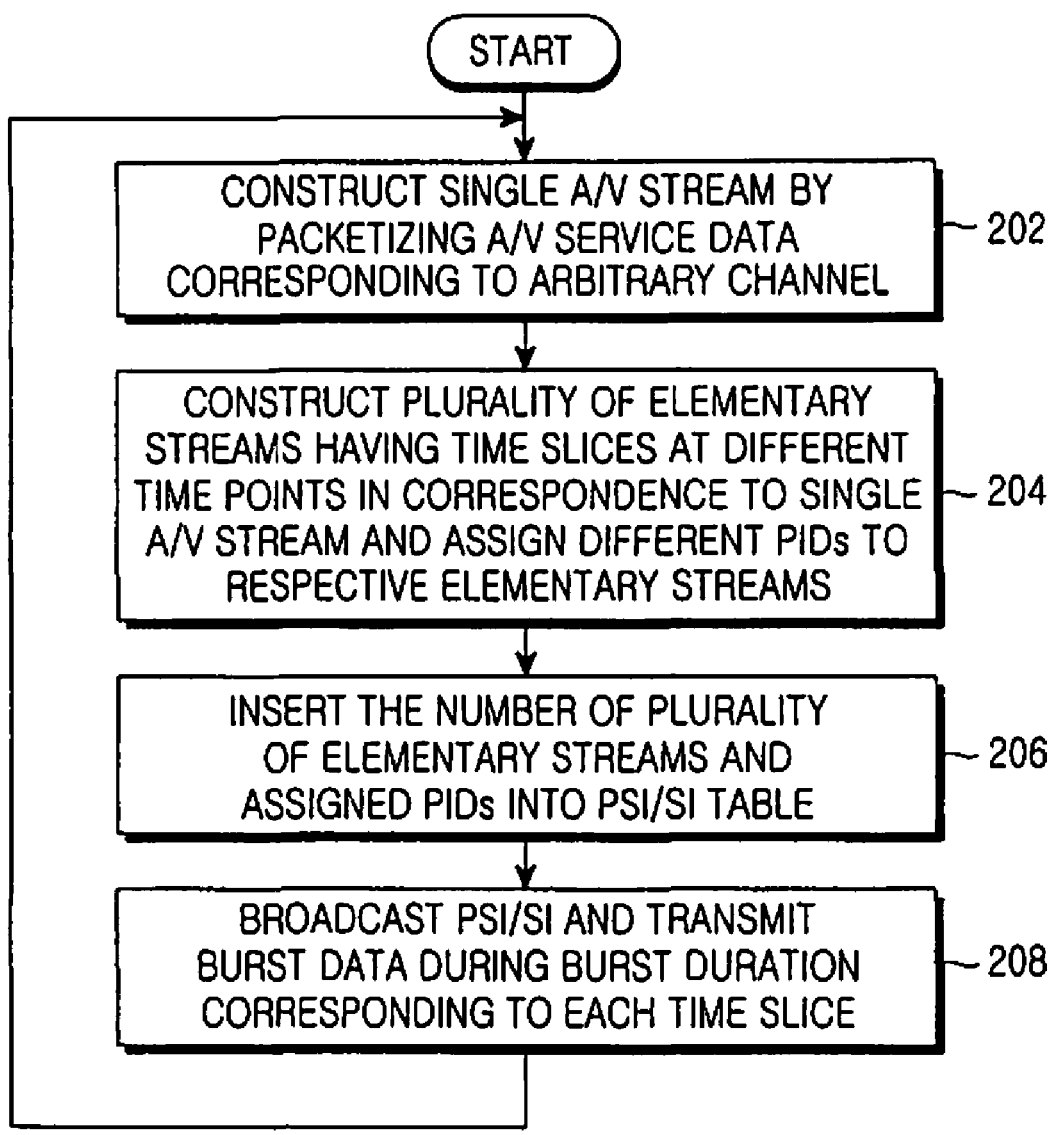
FIG. 5 is a flowchart illustrating an operation of a DVB-H server according to an exemplary embodiment of the present invention.
Figure 6:
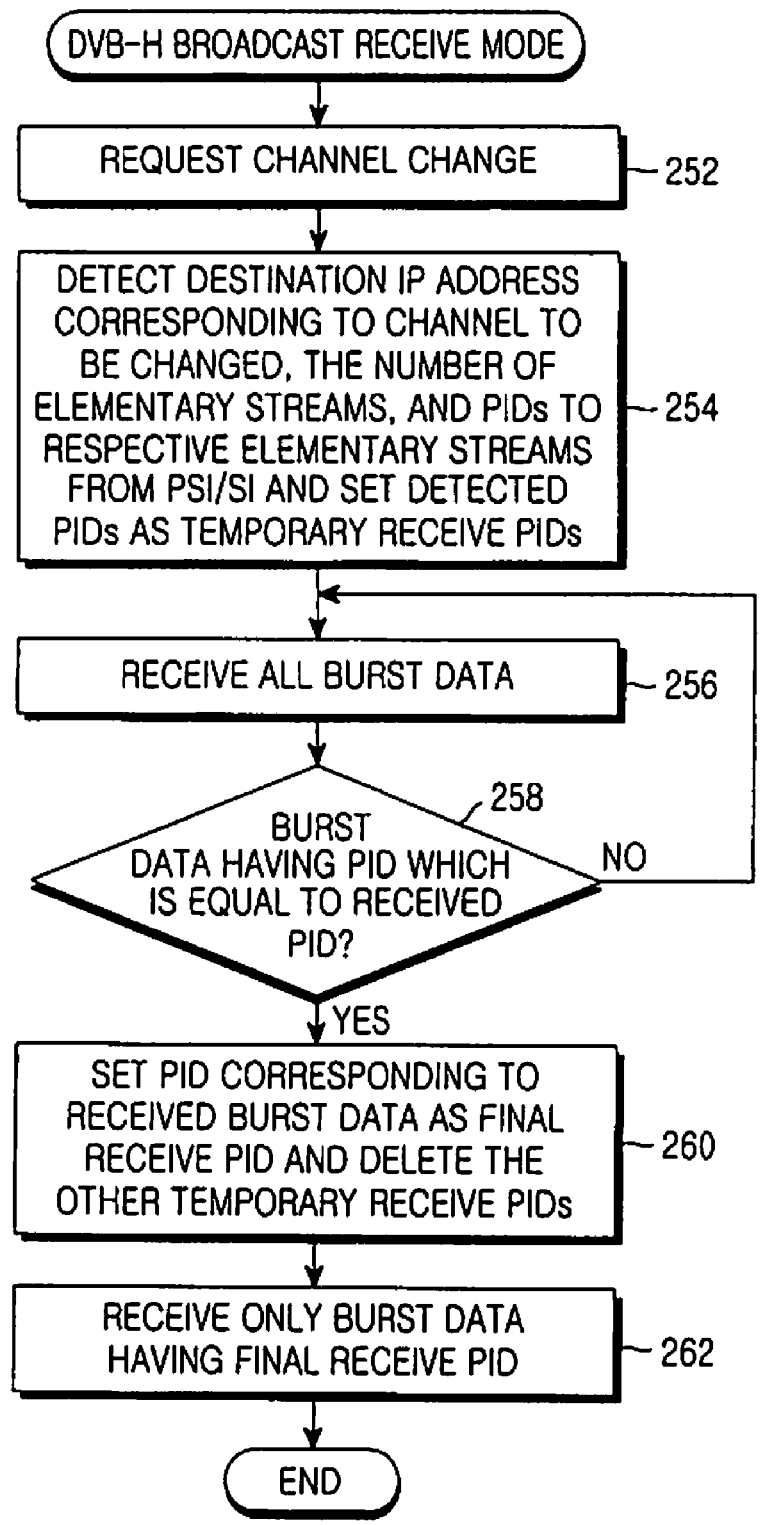
FIG. 6 is a flowchart illustrating an operation of a DVB-H receive terminal according to an exemplary embodiment of the present invention.

FIG. 5 is a flowchart illustrating an operation of the DVB-H server 100 according to an exemplary embodiment of the present invention, and FIG. 6 is a flowchart illustrating an operation of the DVB-H terminal 150 according to an exemplary embodiment of the present invention.

Referring to FIG. 5, the DVB-H server 100 constructs a single A/V stream by packetizing A/V service data corresponding to an arbitrary service channel in step 202. The DVB-H server 100 constructs a plurality of elementary streams having time slices at different time points in response to the single A/V stream in step 204. In this case, the number of elementary streams is more than two, but can be adjusted according to a correlation between the arbitrary service channel and a transmission environment or other service channels. The DVB-H server 100 also assigns different PIDs to the respective elementary streams in step 204. The DVB-H server 100 inserts the number of elementary streams and the PIDs to the respective elementary streams into a PSI/SI table in step 206. The DVB-H server 100 broadcasts PSI/SI and burst data during a burst duration corresponding to each time slice in step 208.

Referring to FIG. 6, if the user requests a channel change in a DVB-H broadcasting receive mode in step 252, the DVB-H terminal 150 proceeds to step 254. The channel change request of the user contains a change request from a channel currently being received to another channel. The DVB-H terminal 150 detects from PSI/SI in step 254 a destination IP address corresponding to a channel to be changed to, the number of elementary streams, and PIDs corresponding to the respective elementary streams. The DVB-H terminal 150 also sets the detected PIDs as temporary receive PIDs in step 254. The DVB-H terminal 150 receives all burst data in step 256. The DVB-H terminal 150 determines in step 258 whether burst data having a PID equal to any of the temporary receive PIDs set in step 254 has been received. If it is determined in step 258 that burst data having any of the temporary receive PID has been received, the DVB-H terminal 150 proceeds to step 260. If it is determined in step 258 that burst data having any of the temporary receive PID has not been received, the DVB-H terminal 150 receives all burst data until burst data having any of the temporary receive PID is received. The DVB-H terminal 150 sets a PID corresponding to the received burst data as a final receive PID and deletes the other temporary receive PIDs in step 260. That is, a PID of firstly received burst data among burst data corresponding to the plurality of PIDs set as the temporary receive PIDs is determined as the final receive PID. The DVB-H terminal 150 controls the digital broadcast receiver 152 to receive only burst data having the final receive PID in step 262.

Accordingly, the DVB-H receive terminal 150 can receive burst data corresponding to a newly selected channel in a shorter period of time than in the prior art, and as the number of elementary streams corresponding to an A/V stream according to the newly selected channel increases, the DVB-H terminal 150 can receive the burst data more quickly.

Some of the distinctions between the prior art and the present invention will now be described with reference to FIGS. 2 and 4.

Figure 1:
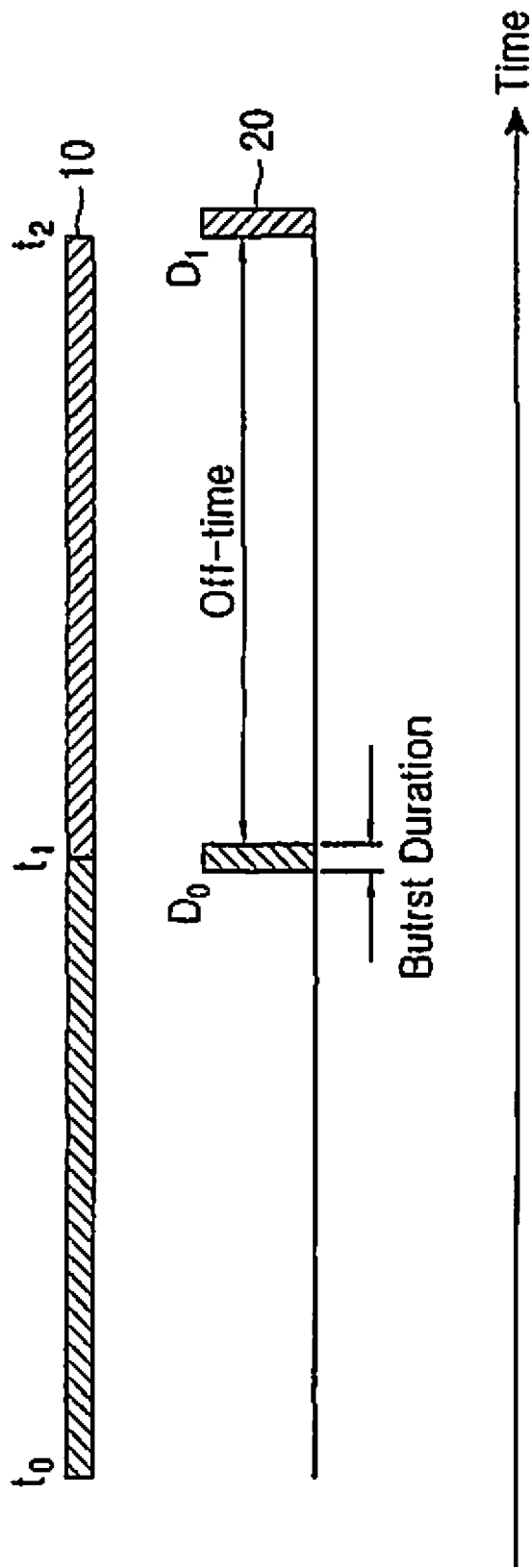
FIG. 1 is a diagram for describing conventional time slicing.
Figure 2:
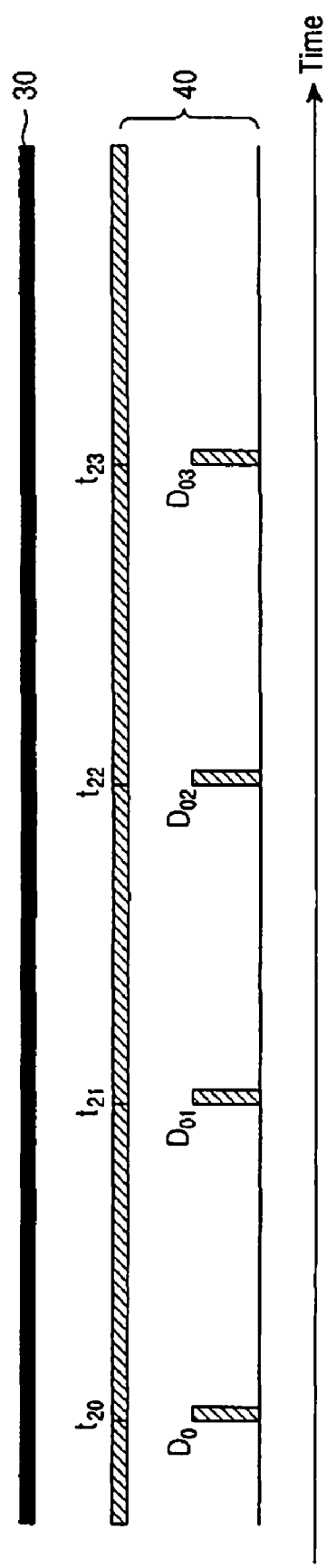
FIG. 2 is a diagram for describing a conventional framing method.

When it is assumed that the A/V stream 30 illustrated in FIG. 2 is equal to the A/V stream 50 illustrated in FIG. 4, FIG. 2 illustrates the conventional data transmission method. According to the prior art, only the elementary stream is constructed by time slicing the A/V stream 30 with respect to a single channel, which is on a time axis, in a period of time from $t_{0N}$ $t_{0(N+1)}$, and data corresponding to $t_{0N}$ to $t_{0(N+1)}$ collected from among the A/V stream 30 is transmitted during a short burst duration, i.e. a relevant time slice, wherein the transmitted data is $D_{0(N+1)}$. Thus, an A/V packet is transmitted only once for a single service channel. Thus, an average receive start time from when the user decides to receive burst data having a PID corresponding to a selected service to when the user receives initial data is $(t_{0(N+1)}-t_{0N})/2$.

However, according to an exemplary embodiment of the present invention, by transmitting a single A/V stream by constructing a plurality of elementary streams corresponding to the single A/V stream, the average receive start time can be reduced. Referring to FIG. 4, corresponding to the A/V stream 50 obtained by arranging A/V packets corresponding to a single service channel on the time axis, the elementary stream 60 equal to the elementary stream 40 illustrated in FIG. 2 is constructed first. That is, the elementary stream 60 for transmitting packets collected during the time from $t_{0N}$ to $t_{0(N+1)}$ for the time slice $D_{0(N+1)}$ is constructed. In this case, it is assumed that the transmitted data is $D_{0(N+1)}$. The second elementary stream 70 for transmitting packets collected during the time from $t_{1N}$ to $t_{1(N+1)}$ for the time slice $D_{1(N+1)}$ is constructed separately from the first elementary stream 60. In this case, it is assumed that the transmitted data is $D_{1(N+1)}$. Thereafter, the transport stream 80 is constructed to contain both $D_{0(N+1)}$ and $D_{1(N+1)}$ as illustrated in FIG. 4, and $D_{0(N+1)}$ and $D_{1(N+1)}$ are transmitted at the same time. Accordingly, if a channel is selected, the DVB-H terminal 150 detects a PID of the first elementary stream 60 and a PID of the second elementary stream 70 by referring to PSI/SI and sets the detected PIDs as temporary receive PIDs. The digital broadcast receiver 152 waits to receive burst data corresponding to the temporary receive PIDs. The DVB-H terminal 150 sets only a PID of burst data first received among the burst data corresponding to the temporary receive PIDs as a final receive PID not to receive burst data corresponding to the other PID, and therefore, the DVB-H terminal 150 receives only burst data corresponding to the final receive PID. If $t_{1N}=t_{0N}+(t_{0(N+1)}-t_{0N})/2$ and $t_{0(N+1)}-t_{0N}=t_{1(N+1)}-t_{1N}$, an average data receive start time is $(t_{0(N+1)}-t_{1N})/2=(t_{1N}-t_{0N})/2=(t_{0(N+1)}-t_{0N})/4=(t_{1(N+1)}-t_{1N})/4$. That is, the average data receive start time of the present invention is twice as fast as the conventional method described above. That is, two or more elementary streams are constructed with respect to a single A/V stream. By doing this, an average time from when the DVB-H terminal 150 decides to receive burst data to when the DVB-H terminal 150 actually receives the burst data is at least twice as fast as the prior art. Accordingly, the beginning speed of DVB-H broadcasting and the channel change speed can both be increased.

As described above, according to the present invention, battery consumption of a DVB-H terminal receiving a DVB-H service can be minimized, and an average time from when a service of a new channel is selected to when packet data is actually received can be decreased. In addition, when a user requests the DVB-H terminal for a channel change to a new channel, the DVB-H service beginning speed of the requested channel and the channel change speed can be improved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of setting a channel of a Digital Video Broadcasting-Handheld (DVB-H) service in a DVB-H terminal, the method comprising:
    receiving a plurality of elementary streams including Audio/Video (A/V) streams and Program Specific Information/Service Information PSI/SI corresponding to a plurality of service channels from a DVB-H server, wherein the PSI/SI includes Packet Identifiers (PIDs), each of the PIDs is uniquely assigned to each of the plurality of elementary streams, and a plurality of elementary streams which corresponds to a single service channel, includes a single A/V stream transmitted multiple times;
    storing the PSI/SI;
    detecting a plurality of elementary streams corresponding to a new service channel and PIDs receiving from the elementary streams corresponding to the new service channel in response to a setting request of the new service channel from a user, and setting the detected PIDs as temporary receive PIDs;
    detecting burst data having a PID equal to any of the temporary receive PIDs from among burst data received from the DVB-H server, and setting the PID corresponding to the detected burst data as a final receive PID; and
    receiving only burst data having the final receive PID.

2. The method of claim 1, wherein receiving the plurality of elementary streams comprises:
    receiving a plurality of elementary streams having time slices at different time points, in response to a single A/V stream.

3. The method of claim 2, wherein detecting the plurality of elementary streams and PIDs comprises:
    detecting a number of a plurality of elementary streams included in the new service channel in response to the setting request of the new service channel from the user;
    detecting the PIDs of the respective elementary stream corresponding to the new service channel by referring to the number of elementary streams from the PSI/SI; and
    setting the detected PIDs as temporary receive PIDs.

4. The method of claim 3, further comprising:
    releasing setting of the temporary receive PIDs except the final receive PID.

5. A system for setting a channel in a Digital Video Broadcasting-Handheld (DVB-H) service, the system comprising:
    a DVB-H server for constructing a plurality of elementary streams including Audio/Video (A/V) streams and Program Specific Information/Service Information PSI/SI corresponding to a plurality of service channels, wherein the PSI/SI includes Packet Identifiers PIDs, and each of the PIDs is uniquely assigned to each of the plurality of elementary streams, a plurality of elementary streams which corresponds to a single service channel, includes a single A/V stream transmitted multiple times and have time slices at different time points; and transmitting burst data of the plurality of elementary streams corresponding to a plurality of service channels during a burst duration corresponding to time slices; and
    a DVB-H terminal for receiving a plurality of elementary streams including A/V streams and PSI/SI corresponding to a plurality of service channels, detecting a plurality of elementary streams corresponding to a new service channel and PIDs from the elementary streams corresponding to the new service channel in response to a setting request of the new service channel from a user, setting the detected PIDs as temporary receive PIDs, and detecting burst data having a PID equal to any of the temporary receive PIDs from among burst data received from the DVB-H server, setting the PID corresponding to the detected burst data as a final receive PID, and receiving only burst data having the final receive PID.

6. The system of claim 5, wherein the DVB-H server constructs the plurality of elementary streams, each having a time slice at a different time point, in response to a single A/V stream.

7. The system of claim 6, wherein the DVB-H terminal detects a number of a plurality of elementary streams included in a new service channel in response to the setting request of the new service channel from the user, detects the PIDs of respective elementary stream corresponding to the new service channel by referring to the number of elementary streams from the PSI/SI and set the detected PIDs as temporary receive PIDs.

8. The system of claim 7, wherein the DVB-H terminal sets the final PID and then releases setting of the temporary receive PIDs except the final receive PID.

9. A Digital Video Broadcasting-Handheld DVB-H terminal for setting a channel in a DVB-H service, the DVB-H terminal comprising:
    a digital broadcast receiver for receiving a plurality of elementary streams including Audio/Video A/V streams and Program Specific Information/Service Information PSI/SI corresponding to a plurality of service channels from a DVB-H server, wherein the PSI/SI includes Packet Identifiers PIDs, each of the PIDs is uniquely assigned to each of the plurality of elementary streams, and a plurality of elementary streams, which corresponds to a single service channel, includes a single A/V stream transmitted multiple times;

PSI/SI analyzer for detecting and outputting a plurality of elementary streams and PIDs corresponding to a new service channel, which has been received from a DVB-H server and stored, in response to a setting request of the new service channel from a user; and a PID setting unit for controlling the digital broadcast receiver to set the detected PIDs as temporary receive PIDs, and if the DVB-H terminal detects burst data having a PID equal to any of the temporary receive PIDs from among burst data received from the DVB-H server, setting the PID corresponding to the detected burst data as a final receive PID, and receiving only burst data having the final receive PID.

10. The terminal of claim 9, wherein the PSI/SI analyzer detects a number of a plurality of elementary streams included in the new service channel in response to the setting request of the new service channel from the user and detecting the PIDs of respective elementary stream corresponding to the new service channel by referring to the number of elementary streams from the PSI/SI.

11. The terminal of claim 10, wherein the PID setting unit sets the final PID and then releases setting of the temporary receive PIDs except the final receive PID.

12. A method of setting a channel of a Digital Video Broadcasting-Handheld DVB-H service in a DVB-H server, the method comprising:

constructing a plurality of elementary streams including Audio/Video A/V streams and Program Specific Information/Service Information PSI/SI corresponding to a plurality of service channels, wherein the PSI/SI includes Packet Identifiers PIDs, each of the PIDs is uniquely assigned to each of the plurality of elementary streams, and a plurality of elementary streams, which corresponds to a single service channel, includes a single A/V stream transmitted multiple times and have time slices at different time points; and transmitting burst data of the plurality of elementary streams corresponding to a plurality of service channels during a burst duration corresponding to time slices.

13. The method of claim 12, wherein said PSI/SI comprises a value of counting the number of the plurality of elementary streams.

14. The method of claim 12, wherein different PIDs are assigned to the respective elementary streams.

15. A Digital Video Broadcasting-Handheld DVB-H server for setting a channel in a DVB-H service, the DVB-H server comprising:

a multi burst data constructor for constructing a plurality of elementary streams including Audio/Video A/V streams and Program Specific Information/Service Information PSI/SI corresponding to a plurality of service channels, and assigning unique Packet Identifiers PIDs to each of the plurality of elementary streams, wherein a plurality of elementary streams, which corresponds to a single service channel, includes a single A/V stream transmitted multiple times and have time slices at different time points;

a descriptor writer for writing the PIDs assigned to each of the plurality of elementary streams into PSI/SI; and a transmitter for transmitting burst data of the plurality of elementary streams corresponding to a plurality of service channels during a burst duration corresponding to the time slices.

16. The server of claim 15, wherein the PSI/SI data comprises the number of the plurality of elementary streams.

17. The server of claim 15, wherein PIDs are assigned differently to the respective elementary streams respectively.

* * * * *